United States Patent
Suzuki et al.

(10) Patent No.: US 7,743,669 B2
(45) Date of Patent: Jun. 29, 2010

(54) LOAD DETECTING SENSOR AND COLLISION DETECTING SENSOR USING THE SAME

(75) Inventors: Akira Suzuki, Hekinan (JP); Hiroyuki Takahashi, Nishikamo-gun (JP); Motomi Iyoda, Seto (JP); Yujiro Miyata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/218,567

(22) Filed: Jul. 16, 2008

(65) Prior Publication Data

US 2009/0019940 A1    Jan. 22, 2009

(30) Foreign Application Priority Data

Jul. 17, 2007    (JP)    ............... 2007-186023

(51) Int. Cl.
*G01L 1/24*    (2006.01)
(52) U.S. Cl. ........................................ 73/800
(58) Field of Classification Search ............ 73/800
See application file for complete search history.

(56) References Cited

U.S. PATENT DOCUMENTS

| | | | | |
|---|---|---|---|---|
| 4,995,639 | A | * | 2/1991 | Breed ..................... 280/735 |
| 7,424,179 | B2 | * | 9/2008 | Ohtaka et al. ............ 385/13 |
| 2005/0193830 | A1 | | 9/2005 | Suzuki |
| 2006/0103514 | A1 | * | 5/2006 | Hosokawa ............... 340/436 |

FOREIGN PATENT DOCUMENTS

| | | |
|---|---|---|
| EP | 1 726 491 | 11/2006 |
| EP | 1 795 878 | 6/2007 |
| JP | 2005-249680 | 9/2005 |
| JP | 2006-500284 | 1/2006 |
| JP | 2006-105973 | 4/2006 |
| JP | 2006-282114 | 10/2006 |
| JP | 2006-337318 | 12/2006 |
| JP | 2007-064715 | 3/2007 |
| JP | 2007-216804 | 8/2007 |
| WO | WO 2007/093890 | 8/2007 |

\* cited by examiner

*Primary Examiner*—Lisa M Caputo
*Assistant Examiner*—Octavia Davis
(74) *Attorney, Agent, or Firm*—Harness, Dickey & Pierce, PLC

(57) ABSTRACT

A load detecting sensor includes a first member, a second member, and an optical fiber. The first member has a groove having a bottom portion and a column portion which defines the groove. The second member covers the groove of the first member so that a surrounded space is formed. The optical fiber is arranged in the surrounded space. At least one of the first member and the second member is made of an elastic body. The surrounded space is deformable when load is applied to at least one of the first and the second members. When load is applied to at least one of the first and the second members, the deformation of the optical fiber is caused following the deformation of the surrounded space. Hereby, the load detecting sensor, which can decrease the manufacturing cost and increase the detecting sensitivity by the optical fiber, can be obtained.

11 Claims, 2 Drawing Sheets

LOAD DETECTING SENSOR AND COLLISION DETECTING SENSOR USING THE SAME

CROSS REFERENCE TO RELATED APPLICATION

This application is based on Japanese Patent Application No. 2007-186023 filed on Jul. 17, 2007, the disclosure of which is incorporated herein by reference.

FIELD OF THE INVENTION

The present invention relates to a load detecting sensor and a collision detecting sensor using the same.

BACKGROUND OF THE INVENTION

Conventional collision detecting sensors are disclosed in JP-A-2006-105973 (Reference 1) corresponding to EP 1795878A1 and in JP-A-2005-249680 (Reference 2) corresponding to US 2005/0193830 A1. The collision detecting sensor of Reference 1 includes an optical fiber and a corrugated plate, which are covered by a mold rubber. The collision detecting sensor of Reference 2 includes a concave holding member, a corrugated member arranged at the bottom of the holding member, an optical fiber arranged inside the concave holding member, and a counterpart member arranged so as to space from the holding member and the optical fiber at the initial state.

However, the sensor of Reference 1 needs to reshape the mold rubber by the press work after the mold rubber is extruded. If the mold rubber is pressed with the optical fiber is set in advance, the optical fiber may be broken. Therefore, for example, the mold rubber is pressed with a metal rod is set in advance, and after the metal rod is removed, the optical fiber needs to be inserted into a hole in which the metal rod was filled. Therefore, the manufacturing cost becomes high in the constitution that the optical fiber is covered by the mold rubber.

On the other hand, the sensor of Reference 2 can resolve the problem of the manufacturing cost since a mold rubber such as Reference 1 is not used. As described in Reference 2, the optical fiber is easily broken. According to Reference 2, when the excessive impact force is generated, since the impact is not transmitted to the optical fiber, the breakage of the optical fiber can be avoided. However, even though the impact force is small, when the optical fiber is pressed by the highly-rigid member directly, the optical fiber may be broken. To solve this problem, an outer surface of the optical fiber is covered by an elastic member such as a rubber. However, by the elastic force of the rubber which is attached to the outer surface of the optical fiber, the pressing force by the corrugated member is likely to be decreased and the sensitivity of the optical fiber is decreased.

SUMMARY OF THE INVENTION

In view of the above-described problems, it is an object of the present disclosure to provide a load detecting sensor and a collision detecting sensor using the same which can decrease the manufacturing cost and increase the detecting sensitivity by the optical fiber.

According to the present disclosure, a load detecting sensor includes a first member, a second member, and an optical fiber. The first member has a groove having a bottom portion and a column portion which defines the groove. The second member covers the groove of the first member so that a surrounded space is formed. The optical fiber is arranged in the surrounded space. At least one of the first and the second members is made of an elastic body. The surrounded space is deformable when load is applied to at least one of the first and the second members.

In the load detecting sensor, when load is applied to at least one of the first and the second members, the deformation of the optical fiber is caused following the deformation of the surrounded space. Hereby, the load detecting sensor, which can decrease the manufacturing cost and increase the detecting sensitivity by the optical fiber, can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Next, a load detecting sensor will be described by taking a collision detecting apparatus for vehicles as an example, which detects that a vehicle collides with an object in front of the vehicle. The load detecting sensor is used as a collision detecting sensor. A collision detecting apparatus for vehicles of a first embodiment will be described with reference to FIG. 1 and FIG. 2.

The collision detecting apparatus is mainly an apparatus which detects that the vehicle collides with a pedestrian (hereinafter referred to as "an outside object"). The collision detecting apparatus includes a bumper reinforcement 1, a bumper cover 2, a bumper absorber 3, a load detecting sensor 4 and an electronic control unit (hereinafter referred to as "ECU") 5.

Figure 1:
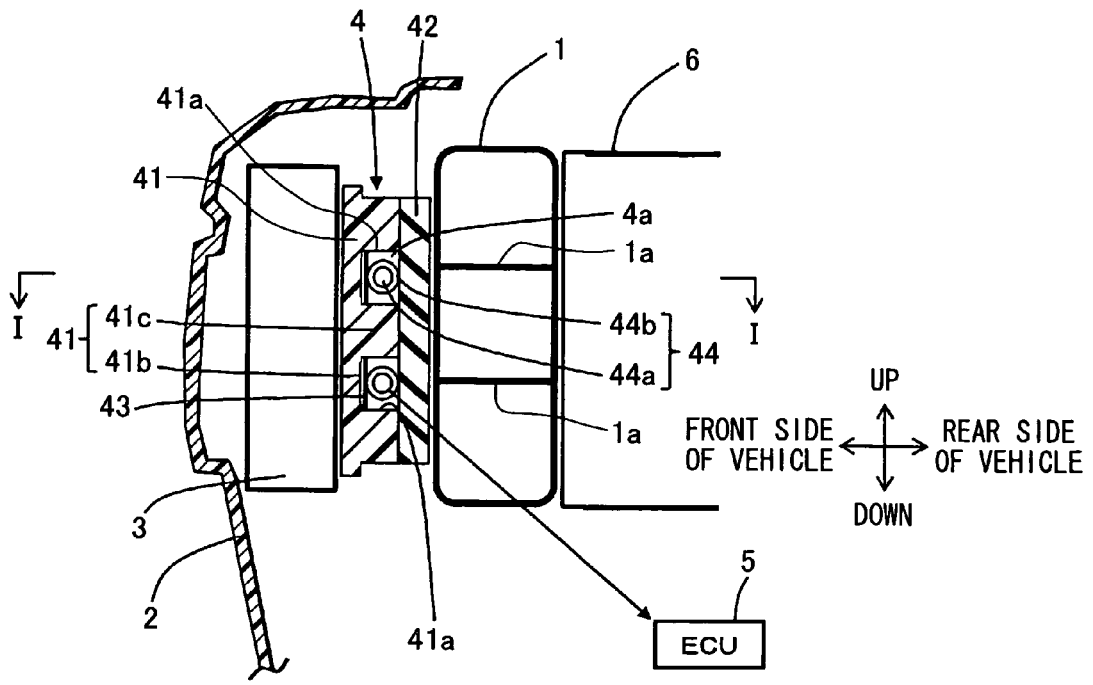
FIG. 1 is a vertical cross sectional view of a vehicle in a front-back direction showing an anterior portion of a vehicle in a load detecting sensor according to a first embodiment.
Figure 2:
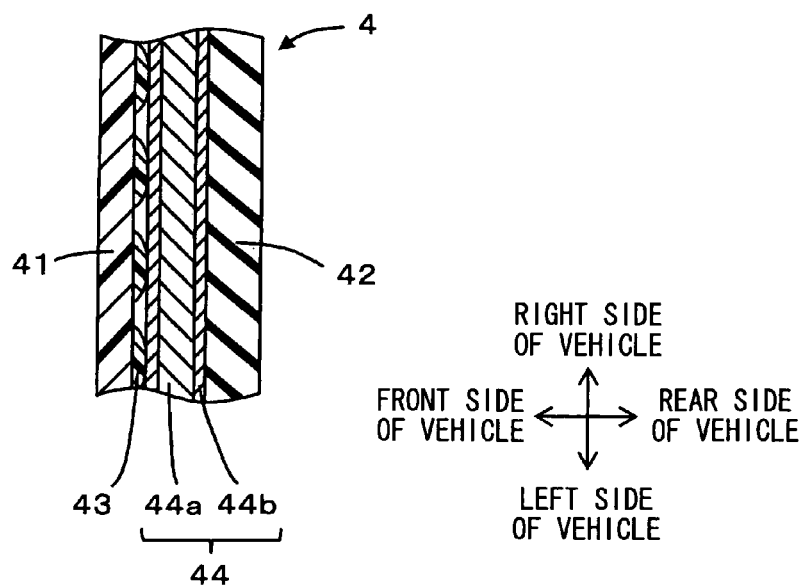
FIG. 2 is a cross sectional view showing a portion of the load detecting sensor taken along line I-I in FIG. 1.

The bumper reinforcement 1 is extended in the lateral direction of the vehicle horizontally, and is a structural member constituting a chassis frame of the vehicle. As shown in FIG. 1, for example, double-deck beams 1a are provided in the center of inside the bumper reinforcement 1, so that the bumper reinforcement 1, which has a cross section like a grid, is formed from a metallic hollow member. The bumper reinforcement 1 is fixed to the forward end of the vehicle of a front side member 6, which is arranged at right and left ends of the vehicle.

The bumper cover 2 is arranged at the most anterior surface of the vehicle and covers the front side of the vehicle of the bumper reinforcement 1. That is, the bumper cover 2 covers the front side of the vehicle of the bumper absorber 3. Therefore, when the vehicle collides with the outside object which locates in front of the vehicle, the bumper cover 2 collides with the outside object. The bumper cover 2 is supported by the bumper absorber 3 so as to be movable relatively with respect to the bumper reinforcement 1 in the direction of the rear side of the vehicle.

As shown in FIG. 1, the bumper absorber 3 is formed from a foam resin, for example. The shape of the bumper absorber 3 is rectangular as seen in the vertical cross sectional view of the vehicle in the front-back direction. The bumper absorber 3 is attached to the load detecting sensor 4 so as to be sandwiched between the bumper reinforce 1 and the bumper cover 2 and so as to extend in the lateral direction of the vehicle horizontally. The bumper absorber 3 has a function of absorbing the impact by crashing and deforming itself, when the front side of the vehicle collides with the outside object. For example, when a pedestrian collides with the bumper cover 2, the bumper absorber 3 has a function to guard the pedestrian's leg portion.

The shape of the load detecting sensor 4 is rectangular as seen in the vertical cross sectional view of the vehicle in the front-back direction. The load detecting sensor 4 is arranged so as to be sandwiched between the bumper reinforcement 1 and the bumper absorber 3 and so as to extend in the lateral direction of the vehicle horizontally. The load detecting sensor 4 includes a first member 41, a second member 42, concave-convex members 43 and optical fibers 44.

The first member 41 is formed from a resin. The shape of the first member 41 is a substantially elongated flat plate. Two concave portions, i.e., grooves 41a and 41a are formed on one surface of the flat plate-shaped first member 41 in the lateral direction. Specifically, the groove 41a is formed so as to extend in the direction (the lateral direction of the vehicle) which intersects the front-back direction of the vehicle (the collision detecting direction of the outside object, the front-back direction in FIG. 1), and so as to open toward the rear side of the vehicle. That is, the first member 41 includes a bottom portion 41b, which forms the bottom surface of the groove 41a, and at least a pair of column portions 41c, which form the side surfaces of the groove 41a and is formed on the bottom portion 41b integrally. The cross-sectional surface of the groove 41a is substantially rectangular. The first member 41 is arranged so that the front side of the bottom portion 41b is attached to the rear side of the bumper absorber 3. Therefore, when the outside object collides with the bumper cover 2, the first member 41 also moves relatively with respect to the bumper reinforcement 1 in the direction of the rear side of the vehicle as the bumper cover 2 moves relatively with respect to the bumper reinforcement 1 in the direction of the rear side of the vehicle.

The second member 42 is formed to be substantially elongated flat plate-shaped. The size of the second member 42 is substantially same as that of the first member 41. The second member 42 is arranged so that one surface of the second member 42 is attached to the end surfaces of the column portions 41c of the first member 41. The second member 42 covers each of the two grooves 41a to form two surrounded spaces 4a and 4a. Furthermore, another surface of the second member 42 is arranged so as to attach to the front side of the vehicle of the bumper reinforcement 1. That is, a part of the second member 42 is arranged to be sandwiched between the column portions 41c and the bumper reinforcement 1.

The second member 42 is formed from an elastic member such as a silicone rubber. Thus, the rigidity of the second member 42 is lower than that of the first member 41. Therefore, when the outside object collides with the bumper cover 2, the first member 41 moves relatively in the rear side direction of the vehicle with respect to the bumper reinforcement 1 and the second member 42 is deformed. The surrounded spaces 4a become narrower by the deformation of the second member 42.

Each concave-convex members 43 is formed from resin and elongated flat plate-shaped. Specifically, the concave-convex member 43 is formed to be corrugated (concave-convex) at a constant pitch on one surface of the elongated flat plate in its longitudinal direction (vehicle lateral direction). The concave-convex member 43 is formed so that another side of the concave-convex member 43 contacts the bottom of the groove 41a, that is, the bottom portion 41b of the first member 41, in the surrounded space 4a. That is, the concave-convex member 43 is fixed to the bottom of the corresponding groove 41a so that the convex portion of the member 43 faces an aperture side of the groove 41a. The concave-convex member 43 may be formed with the first member 41 integrally or separately. When the concave-convex member 43 is formed with the first member 41 integrally, the manufacturing cost can be decreased by reducing the number of components.

The optical fiber 44 includes a fiber core 44a, which has high refractive index, and a fiber clad 44b, which has low refractive index. The fiber clad 44b is arranged around the fiber core 44a. The optical fiber 44 is arranged in each surrounded space 4a. Specifically, in an initial state (a state that the outside object does not collide), the optical fiber 44 contacts the one surface of the second member 42 and the convex portion of the concave-convex member 43 in the surrounded space 4a. That is, when the outside object collides with the bumper cover 2, the flectional deformation of the optical fiber 44 is caused following the deformation of the surrounded space 4a. Therefore, the amount of transmitted light through the optical fiber 44 is changed before or after the collision with the outside object. In addition, the optical fiber 44 and the column portion 41c of the first member 41 may be separated through a space or not.

As known well, the ECU 5 receives a signal of light emitted from a light emitting element at one end of the optical fiber 44 and received at another end of the optical fiber 44. Based on the amount of transmitted light through the optical fiber 44, whether the outside object collides with the bumper cover 2 is determined. For example, when the amount of transmitted light is changed significantly, it is determined that the outside object collides with the bumper cover 2. Moreover, the ECU 5 determines whether the collided outside object is a pedestrian based on the change of the amount of transmitted light.

When the collided outside object is determined a pedestrian, a pedestrian protection device (not shown) is activated. The pedestrian protection device may be mounted on a hood of the vehicle and protects the pedestrian when the vehicle collides with the pedestrian. For example, a device which flips up the hood and an airbag device arranged on the hood may be used as the pedestrian protection device.

Since the optical fiber 44 is not covered by a mold rubber, the manufacturing cost can be decreased. In the initial state, the second member 42 contacts the column portions 41c of the first member 41. Therefore, considering the impact force, which is generated when the outside object collides with the bumper cover 2 and the impact force is received by the second member 42, the impact force is dispersed into a pressing force to the column portion 41c of the first member 41 and a pressing force to the optical fiber 44. Therefore, when the outside object collides with the bumper cover 2, the pressing force received from the first member 41 and the second member 42 is decreased. That is, the damage of the optical fiber 44 can be decreased.

An elastic member such as a rubber is not arranged between the optical fiber 44 and the concave-convex member 43. Thus, when the outside object collides with the bumper cover 2, the optical fiber 44 directly contacts one surface of the concave-convex member 43 and the optical fiber 44 is pressed. That is, the sensitivity of the optical fiber 44 is increased. Furthermore, the optical fiber 44 contacts one surface of the second member 42 and the convex portion of the concave-convex member 43. Thereby, when the outside object collides with the bumper cover 2, the collision can be detected by the optical fiber 44 immediately. Therefore, the detecting sensitivity can be increased.

It is noted that in the first embodiment, the attachment of the optical fiber 44 can be performed as follows. The first attaching method is that the optical fiber 44 is inserted into the groove 41a of the first member 41, and then the second member 42 is fixed to the first member 41. The second attaching method is that the optical fiber 44 is attached to one surface of the second member 42 by adhesion, and then the second member 42 is fixed to the first member 41 so that the optical fiber 44 is inserted into the groove 41a.

Second Embodiment

Figure 3:
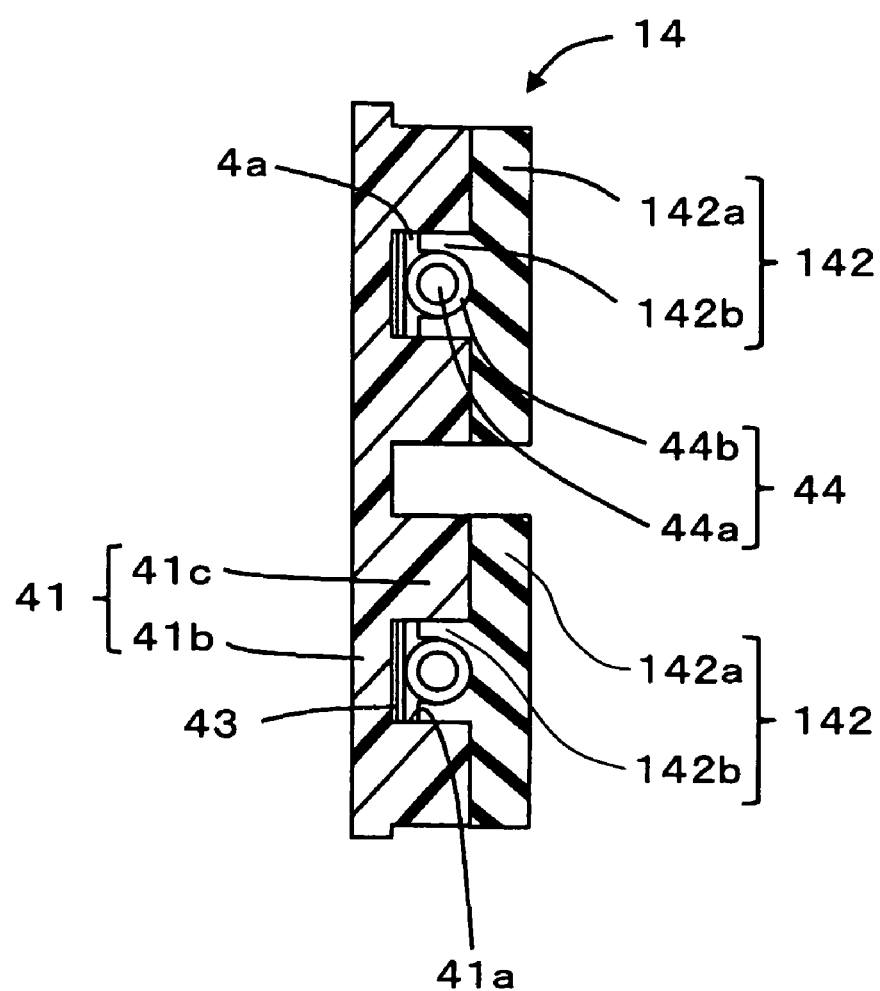
FIG. 3 is a vertical cross sectional view of a vehicle in a front-back direction showing an anterior portion of the vehicle in a load detecting sensor according to a second embodiment.

Next, a load detecting sensor 14 of a second embodiment will be described with reference to FIG. 3. Here, the load detecting sensor 14 of the second embodiment differs from the load detecting sensor 4 of the first embodiment only in a second member 142.

The collision detecting sensor 14 has two second members 142 and 142. Each second member 142 includes a main body portion 142a and a protruding portion 142b. The main body portion 142a is formed to be a generally elongated flat plate shape, and the width of the main body 142a is same as the width between the pair of column portions 41c. The protruding portion 142b is formed to project in the longitudinal direction of the vehicle at substantially center portion of one surface of the main body portion 142a. A concave portion, which receives the optical fiber 44, is formed at an end surface of the protruding portion 142b. Furthermore, the protruding width of the protruding portion 142b in the vehicle lateral direction is substantially same as the groove width of the groove 41a of the first member 41, and the protruding height of the protruding portion 142b from the main body portion 142a is smaller than that of the groove depth of the groove 41a of the first member 41. The second member 142 is arranged so that the protruding portion 142b is fit in the groove 41a and one surface of the main body portion 142a is attached to an end surface of the pair of column portions 41c of the first member 41. As shown in FIG. 3, the concave-convex member 43 and the protruding portion 142b are arranged so as to face each other in a collision detecting direction, i.e., a load detecting direction, and a space is formed between the concave-convex member 43 and the protruding portion 142b. Thus, in case that the concave-convex member 43 shifts to the optical fiber 44 side due to collision, the shifting of the member 43 stops when the member 43 contacts the protruding portion 142b. Therefore, a breakage of the optical fiber 44 by a crash which occurs by the shifting can be prevented.

The attaching method of the load detecting sensor 14 is as follows. Firstly, the optical fiber 44 is fit in the protruding portion 142b of the second member 142. On the other hand, in case that the concave-convex member 43 is arranged separately from the first member 41, the concave-convex member 43 is arranged in the bottom of the groove 41a of the first member 41. Subsequently, the second member 142 holding the optical fiber 44 is fixed to the first member 41 so that the optical fiber 44 and the protruding portion 142b are inserted to the groove 41a of the first member 41. Thereby, the attachment of the optical fiber 44 can become easy, and the manufacturing processes can be decreased.

In the above embodiments, the first member 41 forming the groove 41a is arranged at the front portion of the vehicle. However, the arrangement of the first member 41 and the second member 42, 142 may be reversed in the front-back direction of the vehicle. Moreover, the rigidity of the first member 41 is higher than that of the second member 42, 142. However, the rigidity of the second member 42, 142 may be higher than that of the first member 41. Furthermore, both the first member 41 and the second member 42, 142 may be formed from the elastic body.

In the above embodiments, the concave-convex member 43 is arranged in the bottom of the groove 41a. However, the concave-convex member 43 may be arranged at one surface of the second member 42, 142. In this case, the concave-convex member 43 may be formed with the second member 42, 142 integrally or separately. Moreover, the concave-convex member 43 may be arranged at both the bottom of the groove 41a and one surface of the second member 42, 142. In this case, the pressing forth to the optical fiber 44 can be increased. Furthermore, the concave-convex member 43 is formed to be corrugated, however, may be formed to be stepwise.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A load detecting sensor comprising:
   a first member;
   a second member; and
   an optical fiber, wherein
   the first member has a groove having a bottom portion and a column portion which defines the groove,
   the second member covers the groove of the first member in contact with an end surface of the column portion of the first member so that a surrounded space is formed between the first member and the second member,
   the optical fiber is arranged in the surrounded space,
   at least one of the first member and the second member is made of an elastic body,
   the surrounded space is deformable when load is applied to at least one of the first member and the second member, and
   rigidity of the first member is higher than rigidity of the second member.

2. The load detecting sensor according to claim 1, wherein:
   the second member has a protruding portion holding the optical fiber therein.

3. The load detecting sensor according to claim 2, wherein
   a concave-convex member is arranged in the surrounded space, and
   at least one side of the concave-convex member, which is in contact with the optical fiber, is concave-convex shaped.

4. The load detecting sensor according to claim 3, wherein
   the optical fiber is in contact with a convex portion of the concave-convex member.

5. The load detecting sensor according to claim 4, wherein the optical fiber is in contact with one surface of the second member.

6. The load detecting sensor according to claim 3, wherein the concave-convex member and the protruding portion are arranged so as to face each other in a load detecting direction, and a space is formed between the concave-convex member and the protruding portion.

7. The load detecting sensor according to claim 3, wherein the concave-convex member is formed on at least one of the first member and the second member integrally.

8. The load detecting sensor according to claim 1, wherein the optical fiber and the column portion are separated through a space.

9. The load detecting sensor according to claim 1, wherein the optical fiber is in contact with a surface of the second member which is in contact with the column portion of the first member.

10. The load detecting sensor according to claim 1, wherein the first member, the optical fiber and the second member extend in a direction approximately perpendicular to a loading direction, and the surrounded space between the first member and the second member is deformed in the loading direction when load is applied.

11. The load detecting sensor according to claim 1, wherein each of the first member and the second member is made of an elastic body.

* * * * *